3,441,646
BACITRACIN METAL METHANE SULFINATE
AND PROCESS FOR PRODUCING
Robert S. Baldwin, Montezuma, Ind., assignor to
Commercial Solvents Corporation, a corporation
of Maryland
No Drawing. Filed Jan. 22, 1965, Ser. No. 427,505
Int. Cl. A61k 21/00; A23k 1/17; C07g 11/00
U.S. Cl. 424—177
14 Claims

ABSTRACT OF THE DISCLOSURE

Bacitracin metal methane sulfinate in which the metal is preferably an alkali metal or a metal of Groups IIa, IIb and VIIb. The products of this invention can be prepared by dissolving bacitracin and a substantially water soluble metal formaldehyde sulfoxylate in water and allowing the mixture to stand. The products of the invention have less nephrotoxicity than bacitracin without substantial lessening of the antibacterial properties.

---

The present invention relates to the production of novel bacitracin products. In a particular aspect the present invention is directed to a product useful as an animal feed additive obtained by reacting bacitracin and a metal formaldehyde sulfoxylate to produce bacitracin metal methane sulfinate products.

Although the antibiotic bacitracin, when administered other than parenterally, is virtually nontoxic, administration intramuscularly or intravenously in large doses has been noted to produce a toxic effect on the kidneys. In one aspect, the present invention involves reducing the nephrotoxicity of bacitracin when administered other than parenterally without substantial lessening of the antibacterial properties of the antibiotic.

In the production of the novel bacitracin metal methane sulfinate product, the reaction occurs between the sulfoxylate and one or more of the bonds of the basic nitrogen atoms in the bacitracin molecule to bind the metal methane sulfinate to the nitrogen atom. For instance, when sodium formaldehyde sulfoxylate is used, the basic nitrogen atom is attached to the resulting sodium methane sulfinate as shown by the structural representation

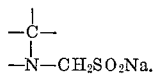

The bacitracin metal methane sulfinates can be produced by the reaction of bacitracin and a metal formaldehyde sulfoxylate (M.F.S.) by reacting the M.F.S. and bacitracin in a mole ratio generally from about 1 to 15 moles, preferably 2 to 8 moles of M.F.S., for each mole of bacitracin used. The formaldehyde sulfoxylates of metals such as, for instance, the alkali metals sodium and potassium, Group IIA metals, e.g. calcium and magnesium, Group IIB metals, e.g. zinc, and Group VIIB metals, e.g. manganese can be used. Sodium formaldehyde sulfoxylate (S.F.S.) is preferred since it can be used to produce bacitracin sodium methane sulfinate which exhibits significantly reduced nephrotoxicity while retaining the antibiotic activity of the bacitracin. The amount of S.F.S. reacted with the bacitracin should in all cases be sufficient to provide a product of reduced toxicity and in most cases should not exceed about 5 moles of S.F.S. per mole of bacitracin. The use of an excessive amount of S.F.S., e.g. about 26 moles of S.F.S. per mole of bacitracin, can result in a toxic solution.

The novel products of the present invention can be conveniently prepared by dissolving the bacitracin and a substantially water soluble M.F.S. in water and permitting the mixture to stand for a time sufficient to complete the reaction. The reaction proceeds readily at room temperature and is completed in most cases in about ½ to 3 hours. Although unnecessary, elevated temperatures can be employed if desired to hasten the reaction. Alternative to dissolving the reactants in an aqueous medium, separate solutions of the bacitracin and the M.F.S. can be prepared, for instance, an aqueous solution of bacitracin and a solution of S.F.S. in water or saline and the solutions mixed together. The reaction mixture can be employed as in the treatment of the subject or if desired the reaction products can be dried to a solid, preferably freeze-dried at temperatures below about 0° C. The solid product may then be placed in appropriate administrative form in accordance with conventional methods.

The above described methods can be used when the M.F.S. used is substantially water soluble. When the M.F.S. and the bacitracin metal methane sulfinate of a desired metal are substantially water insoluble, the preferred procedure is to react, in aqueous solution, a substantially water soluble metal methane sulfinate with a water soluble salt of said desired metal, thereby forming a precipitate of the bacitracin desired metal methane sulfinate. For example the zinc and manganese formaldehyde sulfoxylates are substantially water insoluble as are the corresponding bacitracin metal methane sulfinates. Accordingly, a substantially water soluble bacitracin metal methane sulfinate (for example an alkali metal salt, bacitracin sodium methane sulfinate or bacitracin potassium methane sulfinate) is reacted with a water soluble salt of the desired metal (for example zinc chloride, zinc sulfate, manganese chloride, etc.) in an aqueous solution whereby a precipitate of the bacitracin desired metal methane sulfinate (for example bacitracin zinc methane sulfinate or bacitracin manganese methane sulfinate) forms in the solution and may be recovered from the solution by decantation, filtration, centrifugation, etc.

The bacitracin metal methane sulfinates can be employed in antibiotic amounts in animal feeds, advantageously with inert or nutrient diluents to obtain the feed supplement which is desired. Diluents which can be used include ordinary feed ingredients such as soy flour, finely ground wheat middlings, corn meal and the like along with other growth-promoting materials such as vitamin $B_{12}$, for instance.

The following examples are included to further illustrate the present invention.

EXAMPLE I

Bacitracin sodium methane sulfinate

Four different concentrations of sodium formaldehyde sulfoxylate (0.75%, 1.5%, 3.0% and 6.0%) in saline were prepared. To 10 milliliters of each solution was added 0.169 gram of regular bacitracin (assaying 59 units mg.) to obtain bacitracin sodium methane sulfinate solutions that calculated 1000 units per ml. A bacitracin solution containing 0.169 grams of bacitracin and calculated 1000 u./ml. was prepared as a control. A 6.0% sodium formaldehyde sulfoxylate solution in saline was also prepared as a control.

The mixtures were allowed to stand at room temperature for about 2 hours and each of the mixtures was injected into mice at a dose of 500 u. (units) per mouse.

The toxicity results are summarized in the table below:

TABLE

| Test material | Dose I.V. (u./mouse) | Moles of S.F.S. per mole Bacitracin | Deaths 18 hours | Nephrotoxicity (at autopsy) |
|---|---|---|---|---|
| Bacitracin Control, 1,000 u./ml. 80163-6. | 500 | | 4/10 | All mice show typical completely bleached kidneys. |
| Bacitracin, 1,000 u./ml. and S.F.S. (0.75%). | 500 | 3.37/1 | 0/10 | All mice showed spotted kidneys indicating considerable damage. |
| Bacitracin, 1,000 u./ml. and S.F.S. (1.5%). | 500 | 6.7/1 | 0/10 | All mice showed some spots on kidneys to a lesser degree than above. |
| Bacitracin, 1,000 u./ml. and S.F.S. (3.0%). | 500 | 13.4/1 | 0/10 | Four animals showed spotted kidneys, all others being grossly normal. |
| Bacitracin, 1,000 u./ml. and S.F.S. (6.0%). | 500 | 26.4/1 | 10/10 | Solution is toxic due to S.F.S. |
| S.F.S. (6.0%) | | | 10/10 | Toxic solution. |

The results clearly show the advantageously reduced toxicity in animals exhibited by the novel reaction product of the invention. The data also demonstrate the importance of not employing too much sodium formaldehyde sulfoxylate in the preparation of the reaction product of the invention.

EXAMPLE II

Twenty grams of bacitracin were mixed with 8.8 grams of S.F.S. in 100 cc. of water, the mixture was stirred until a solution was obtained, and two hours later the solution was freeze-dried to provide 27.4 grams of bacitracin sodium methane sulfinate with an assay of 36 units of bacitracin activity per milligram. This product was checked for toxicity and was found to have an LD 50 in mice of 1525±122 units per mouse when injected I.V.

EXAMPLE III

This example was conducted following essentially the same procedure used in Example II except 7.05 grams of S.F.S. were used to provide 25.6 grams of bacitracin sodium methane sulfinate with an assay of 43 units of bacitracin activity per milligram and an LD 50 in mice of 1850±193 units per mouse when injected I.V. Bacitracin has an LD 50 in mice of from about 400 to 600 units per mouse.

EXAMPLES IV AND V

Essentially the same procedure used in Example III is followed except instead of sodium formaldehyde sulfoxylate, the following metal formaldehyde sulfoxylates are used to produce the following bacitracin metal methane sulfinates.

| Example | Metal formaldehyde sulfoxylate | Bacitracin metal methane sulfinates |
|---|---|---|
| IV | Potassium formaldehyde sulfoxylate. | Bacitracin potassium methane, sulfinate. |
| V | Calcium formaldehyde sulfoxylate. | Bacitracin calcium methane sulfinate. |

EXAMPLE VI

Twenty grams (20.0 g.) of bacitracin were mixed with 8.8 grams of S.F.S. in 100 cc. of water and the mixture was stirred thereby producing a solution of bacitracin sodium methane sulfinate.

A concentrated solution of zinc sulfate was then added to the solution of bacitracin sodium methane sulfinate in an amount sufficient to precipitate substantially all of the bacitracin as bacitracin zinc methane sulfinate. The bacitracin zinc methane sulfinate is recovered by filtration and dried at ambient temperature. The dried product is mixed with a diluent animal feed ingredient to form an animal feed supplement.

EXAMPLE VII

Bacitracin manganese methane sulfinate is prepared in substantially the same manner as described above in Example VI except that manganese chloride is used instead of zinc sulfate.

EXAMPLE VIII

An animal feed is prepared by mixing 50 grams of bacitracin sodium methane sulfinate in a chick ration containing 1200 lbs. of yellow corn, 100 lbs. of wheat middlings, 20 lbs. of oats, 480 lbs. of soybean meal and 0.5 lb. of vitamin $B_{12}$.

It is claimed:

1. Bacitracin metal methane sulfinate in which the metal is selected from the group consisting of metals of Groups IIa, IIb, and VIIb of the Periodic Chart and alkali metals.

2. Bacitracin sodium methane sulfinate.

3. A method for producing bacitracin metal methane sulfinate which comprises reacting bacitracin and a substantially water soluble metal formaldehyde sulfoxylate in which the metal is selected from the group consisting of metals of Groups IIa, IIb, and VIIb of the Periodic Chart and alkali metals in a mole ratio of from about 1 to 15 moles of metal formaldehyde sulfoxylate for each mole of bacitracin for a period of time sufficient to produce the bacitracin metal methane sulfinate.

4. The method of claim 3 wherein sodium formaldehyde sulfoxylate is used in a mole ratio to bacitracin of about 2 to 8 moles of sodium formaldehyde sulfoxylate per mole of bacitracin.

5. A method for producing a substantially water insoluble bacitracin metal methane sulfinate which comprises reacting, in aqueous solution, a substantially water soluble bacitracin alkali metal methane sulfinate selected from the group consisting of bacitracin sodium methane sulfinate and bacitracin potassium methane sulfinate with a substantially water soluble metal salt selected from the group consisting of substantially water soluble zinc salts and manganese salts for a period of time sufficient to form a precipitate of the respective substantially water insoluble bacitracin metal methane sulfinate.

6. The method of claim 5 wherein bacitracin sodium methane sulfinate is reacted with zinc sulfate to form a precipitate of bacitracin zinc methane sulfinate.

7. The method of claim 5 wherein bacitracin sodium methane sulfinate is reacted with manganese chloride to form a precipitate of bacitracin manganese methane sulfinate.

8. An animal feed comprising a nutrient ration and antibiotic amounts of bacitracin metal methane sulfinate in which the metal is selected from the group consisting of metals of Groups IIa, IIb and VIIb of the Periodic Chart and alkali metals.

9. An animal feed comprising a nutrient ration and antibiotic amounts of bacitracin sodium methane sulfinate.

10. Bacitracin metal methane sulfinate wherein the metal is an alkali metal.

11. Bacitracin metal methane sulfinate wherein the metal is a metal of Group IIa of the Periodic Chart.

12. Bacitracin metal methane sulfinate wherein the metal is a metal of Group IIb of the Periodic Chart.

13. Bacitracin metal methane sulfinate wherein the metal is a metal of Group VIIb of the Periodic Chart.

14. A method for producing bacitracin metal methane sulfinate which comprises reacting, in aqueous solution, bacitracin and a substantially water soluble metal formaldehyde sulfoxylate, the metal of which is selected from the group consisting of metals of Groups IIa, IIb and VIIb of the Periodic Chart and alkali metals, in a mole ratio of from about 1 to 15 moles of metal formaldehyde sulfoxylate for each mole of bacitracin for a period of time sufficient to produce the bacitracin metal methane sulfinate.

References Cited

UNITED STATES PATENTS

| | | | |
|---|---|---|---|
| 2,774,712 | 12/1956 | Baron | 167—65 |
| 3,035,919 | 5/1962 | Ziffer et al. | 167—65 |
| 3,044,954 | 7/1962 | Wilkinson | 167—65 |
| 3,061,515 | 10/1962 | Fardig | 167—65 |
| 3,205,137 | 9/1965 | Lewis et al. | 167—65 |

ALBERT T. MEYERS, *Primary Examiner.*

D. M. STEPHENS, *Assistant Examiner.*

U.S. Cl. X.R.

99—2